April 12, 1949.  L. J. KENYON  2,466,772
INJECTION MEAT-CURING MACHINE

Filed June 13, 1947  3 Sheets—Sheet 3

INVENTOR
Lee J. Kenyon
BY
ATTORNEY

Patented Apr. 12, 1949

2,466,772

UNITED STATES PATENT OFFICE 2,466,772

INJECTION MEAT-CURING MACHINE

Lee J. Kenyon, Lawrence, N. Y.

Application June 13, 1947, Serial No. 754,349

6 Claims. (Cl. 99—257)

This invention relates to the curing of meat by means of a curing fluid or brine injected into the meat. More specifically this relates to apparatus for thus curing the meat, in which the meat is positioned as upon a supporting member or platform, and a reciprocable fluid-injecting piercing member is movable transversely of and relative to the platform so that it can advance into and retract from the meat.

It is among the objects to provide apparatus of this kind which is easy to manipulate and capable of being operated at an efficient speed; which is highly positive in its action, as well as efficient as to injection and uniform distribution of the fluid or brine into the meat; which is compact; which is easy to maintain clean; which is simple of construction, yet rugged, and comprises a minimum of movable parts; which has a minimum of movable parts exposed to the brine; in which the injection of the curing fluid is timed as a function of the positioning of the piercing member relative to the meat, and in the operation of which a minimum of curing fluid escapes prematurely from the piercing member.

I attain these objects by providing upon a base a resiliently depressible platform to receive the meat, and a plurality of upwardly directed fluid-injecting piercing members which penetrate into the meat when the platform is depressed by a movable top confining member bearing down upon the meat.

According to one feature the depressible platform has at its underside vertical guide means upon the base whereby its upward motion is limited, and displaceable to render the platform readily releasable and detachable from the guide means.

According to another feature the platform is yieldably supported by leaf springs.

According to another feature the injection of the curing fluid is controlled and timed by lost motion actuating means through which the movement of the platform actuates a fluid supply valve.

According to another feature the top confining member is swingably mounted in a frame surrounding it, which frame in turn is swingably mounted upon the base.

According to still another feature the base provides a tray under and around the depressible meat-receiving platform.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a plan view of the apparatus with parts broken away to show the releasable guide means.

Figure 1:
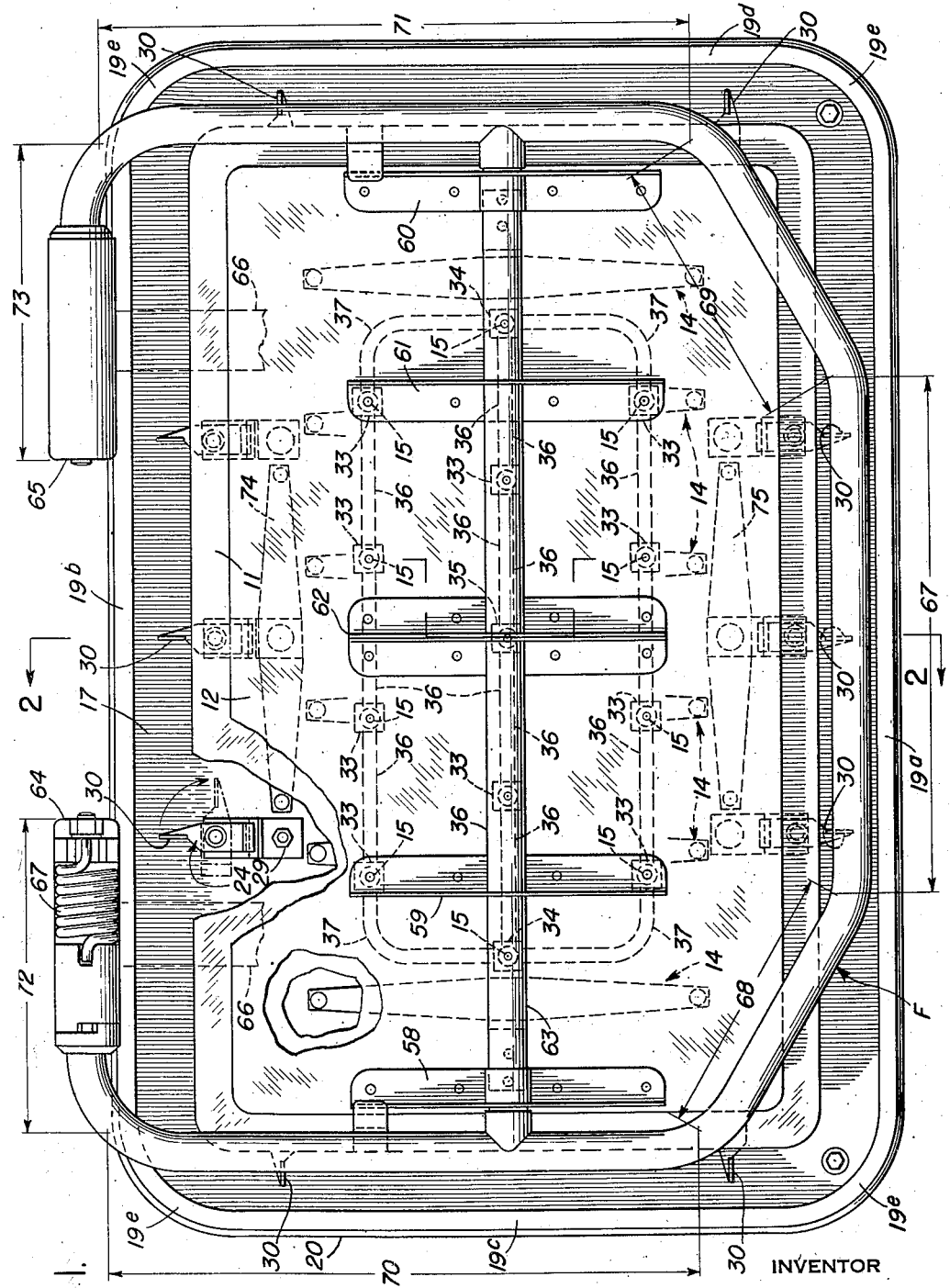

The apparatus comprises a stationary portion or base 10, a depressible meat receiving platform 11, and a movable top confining member or plate 12. A piece of meat 13 to be cured can be placed between the platform 11 and the confining member 12, and the member 12 forced down upon the meat sufficiently to depress the platform 11 against the pressure of leaf spring units 14 and allow a set of upwardly pointed fluid-injecting stationary piercing members 15 to penetrate into the meat through openings 16 in the platform 11.

The stationary portion or base 10 comprises a base plate 17 supported by posts or legs 18. Peripherally from the base plate 17 rises a wall 19 having end portions 19$^a$ and 19$^b$, and side portions 19$^c$ and 19$^d$, and rounded corner portion 19$^e$, thus forming a tray fitted or set into a steel frame 20 mounted or fastened upon the posts 18.

The platform 11 is urged upwardly by a set of six leaf spring units 14 each of which units comprises a downwardly curved half 14$^a$ and an upwardly curved half 14$^b$, the corresponding ends of the halves joining one another tangentially and being fastened together as by rivets 14$^c$ and 14$^d$ respectively. The lower half of each spring unit is suitably fastened at its lowest point to the base plate 17, while the upper half at its highest point has a hole 21 in which lodges a projection 22 provided at the underside of the platform 11, so that the platform can be removed while the spring units 14 remain in place.

The platform 11 is depressibly mounted upon the base plate 17 in a telescopic manner which provides downwardly extending telescopic guide elements or portions 23 fastened to the underside of the platform 11, having sliding relationship with upwardly extending complementary guide elements or anchoring elements 24. That is to say, each element 23 consists of a horizontal upper end portion 23ª whereby it is fastened to the underside of the platform 11 as by a screw, a vertical downwardly extending body portion 23ᵇ and a lower short outwardly extending end portion 23ᶜ. Each complementary element 24 comprises a horizontally extending foot portion 24ª, a vertically rising body portion 24ᵇ, and an inwardly extending short upper end or top portion 24ᶜ engaging over the lower end portion 23ᶜ (see Fig. 2) of the associated member 23. The foot portion 24ª is mounted to be swingable horizontally, that is about a vertical axis, as by means of a bolt or screw 26 screwed into a foot member 27 which in turn is fastened to the base plate 17 as by bolts 28 and 29. The element 24 is swingable by means of a finger tab 30 in the manner indicated in Fig. 1 by the dot-and-dash line position. The full-line position of the element 24 in Fig. 1 corresponds to the operative position of that element in Fig. 2, while the dot-and-dash line position is that in which the member is inoperative and releases the associated member 23. An element 23 cooperatively associated with an element 24 may herein be called a guide unit G. Several such guide units may be provided suitably spaced from one another along each side of the platform 11 so that there might be eight such guide units in all, although ten such units are shown, that is two at each short side and three at each long side. All elements 24 may be swung to the dot-and-dash line position in order to release and remove the platform 11.

The piercing members 15 having brine emitting orifices 15ᵇ are connected to a distributing pipe system H disposed underneath the base plate 17. Each piercing member 15 has an internally threaded foot portion 15ª by means of which it is screwed over a corresponding externally threaded vertical pipe portion 32, such vertical pipe portions 32 being provided at their lower ends with a nipple 33, 34 or 35 respectively for horizontal pipe connections. The vertical pipe portions 32 extend through the base plate 17 by way of holes suitably sealed against fluid leakage and are rigidly held as by nuts 32ª engaging suitable threading upon the tube portions 32 and tightened against the top face of the base plate 17. In Fig. 1 are shown three longitudinal rows of piercing members 15, the central row comprising five, the two outer rows each comprising four such piercing members. All except the members 15 at each end and that in the middle of the central row have vertical pipe portions which have nipples 33 for horizontally throughgoing pipe connection, the two end nipples 34 being for a similar horizontal throughgoing connection as well as for an additional lateral horizontal branch, while the central nipple 35 is for horizontally throughgoing connection as well as for a branch connection at the bottom.

The nipples 33, 34 and 35 are connected with straight pipe sections 36 of which there are ten, and curved or corner pipe sections 37 of which there are four, the nipples 33, 34 and 35 and the pipe sections 36 and 37 thus constituting a header H supplied with curing liquid or brine by a vertical supply pipe 38 connected with nipple 35 at its upper end and with T-connection 39 at its lower end. The lower end of the T-connection has a drain cock 40, while the lateral branch is connected with a horizontal pipe 41 leading from a control valve unit indicated at 42 and supplied with brine as by a pipe 43, the brine being supplied to the unit 42 under pressure as from a pump (not shown). The valve unit 42 is fastened to the underside of the base plate 17 as by a bracket 42ª.

The control valve unit 42 has in it a vertical actuating plunger-like member 44 the up-and-down movement of which controls the admission of brine to the pipe header H and the fluid-injecting piercing members 15. That is to say, the member 44 is normally spring urged upwardly into valve-closing position. The member 44 has a flat head portion 45 upon which engages a vertical tappet or rod 46 guided in a bushing 47 fixed in the base plate 17 and having sealing relationship therewith due to a shoulder portion 48 of the bushing being tightened against the top face of the base plate 17 by means of a tightening nut 49 engaging upon the lower end of the bushing underneath the base plate 17. A small wearing surface is provided at the underside of the platform 11 directly above the tappet 46 in the form of a flat head screw member 50 screwed into the platform 11 from the underside. A bell crank lever 51 is provided upon the bracket 42ª and has a free horizontal arm 52 engaging upon and having camming contact with the top face of the plunger-like member 44, and a vertical arm 53 loosely connected with a horizontal actuating rod 54 having at its free end a hand-piece 55, the rod being slidably supported in a bracket 56 fastened to the frame 20. A drainage pipe 57 extends downwardly from the base plate 17 allowing brine that might leak from the piercing members 15 to be passed away by opening a drain cock 58 at the lower end of pipe 57.

The confining member or plate 12 has fastened to its topside a number of brackets 58 and 59 at one end, brackets 60 and 61 at the other end, and a bracket 62 in the middle, the brackets being fastened as by screws 62ª countersunk at the underside of the plate. Rotatable in the brackets is a tubular member or rod 63 extending substantially from end to end of the plate 12 and constituting a transverse portion of a frame or bail F swingably mounted as at 64 and 65 upon a bracket construction 66 (see Fig. 2) fastened to the underside of the frame 20. Each of the swingable mountings 64 and 65 of the frame comprises a torsion spring 67 counterbalancing the weight of the frame and tending to hold the same in a raised or upwardly swung position.

The bail F is (see Fig. 1) composed of a front or handle portion 67, diagonal front corner portions 68 and 69, side portions 70 and 71, and rear end portions 72 and 73.

The top face of the platform 11 when in its upper limit position (see Fig. 2) is flush with the top edge face of the surrounding wall 19 of the tray structure of which wall 19 constitutes a part. Also in this upper limit position the piercing members 15 terminate just sufficiently below the top face of the platform to insure their non-interference with the piece 13 when it is slid onto the platform 11 for curing.

In addition to the leaf spring units 14 there are provided similar platform supporting spring units 74 and 75 (see Fig. 1) extending at right angles to the units 14, that is one unit extending along each long side of the platform 11. This combination of transversely and longitudinally extending spring units, herein also simply termed the transverse and the longitudinal spring units or the transverse and the longitudinal groups of spring units, provides for substantially evenly distributed spring support for the platform 11, which uniform distribution facilitates the straight line depression or vertical guidance of the platform 11.

The spring units 74 and 75 consist of halves or component leaf springs 74a and 74b, and 75a and 75b respectively and they are mounted in the same fashion as the spring units 14 in that they have their lower halves or lower leaf springs fastened to the tray bottom or plate 17 as by bolts 29, while the upper halves or leaf springs through holes provided in the topmost portion thereof engage over respective projections 22a and 22b which projections extend downwardly from the under side of the platform 11. The projections 22a and 22b constitute the inverted head portion of screw bolts 25 screwed into sockets 25a which sockets in turn are anchored in the platform 11.

*Operation*

Prior to the actual curing operation the fluid or brine supply and distributing pipes may be cleared of entrapped air by pulling on the hand-piece 55 and thus on the actuating rod 54 to open the passage through the valve unit 42 to admit fluid supplied under pressure. The passage through the valve unit opens as the pull on the rod 54 forces the arm 52 of bell crank 51 down upon head 45 of the valve member 44. Consequently, the releasing of the hand-piece 55 will permit the valve member 44 to return to valve-closing position. Air and initial fluid may then be allowed to escape by opening the drain cock 40. Air may thus also be displaced from the piercing members 15 after cock 40 has been closed. After the conduits or pipes have thus been cleared of air, hand-piece 55 is released shutting the valve unit and thereby shutting off the brine. Any brine which may have leaked from the piercing members 15 may be drained from the tray portion of the base 10 through the drain cock 58.

Figure 2:
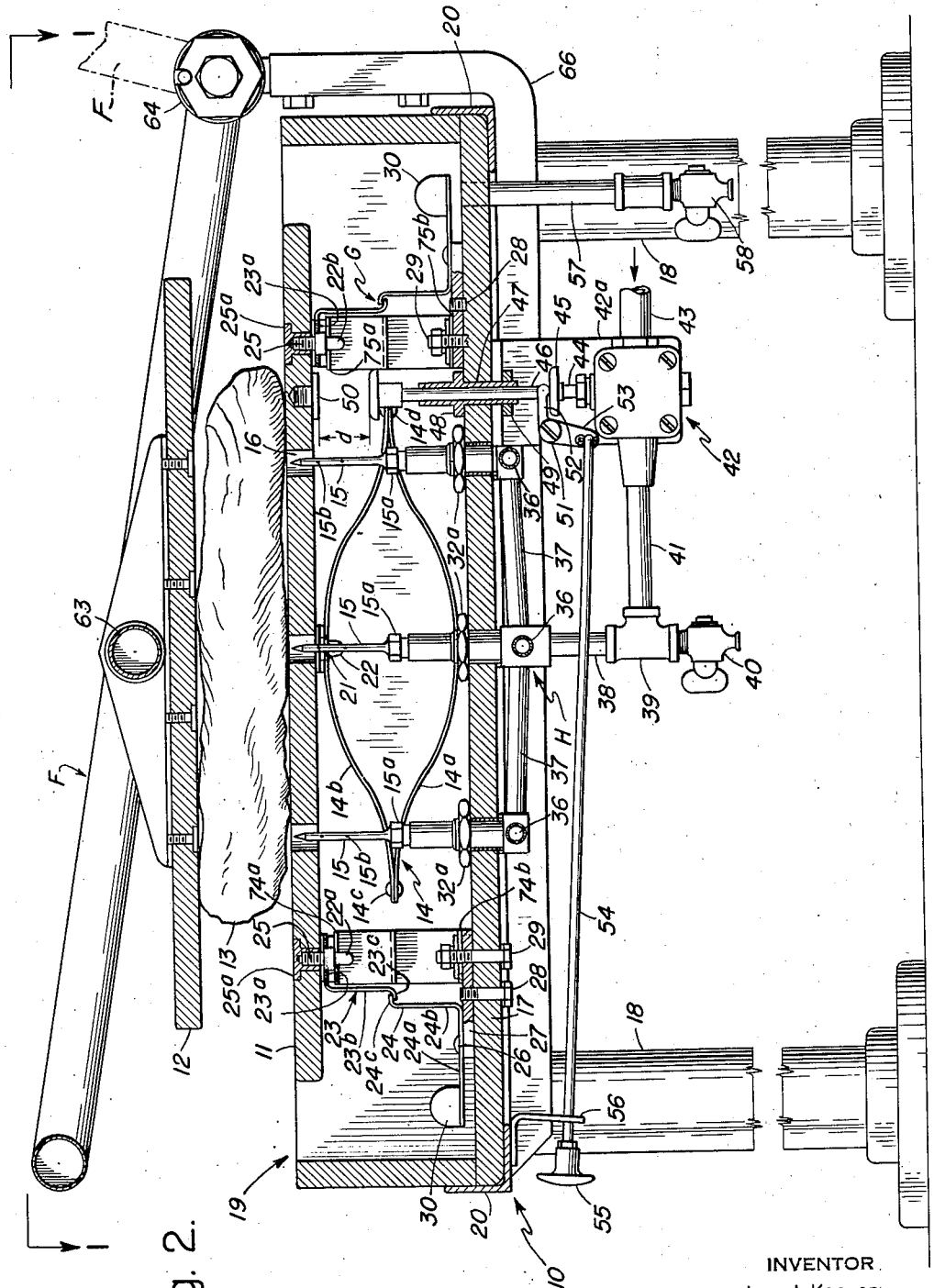
Fig. 2 is a longitudinal vertical sectional view taken on the line 2—2 in Fig. 1 showing the initial operating position of the meat-receiving platform.
Figure 3:
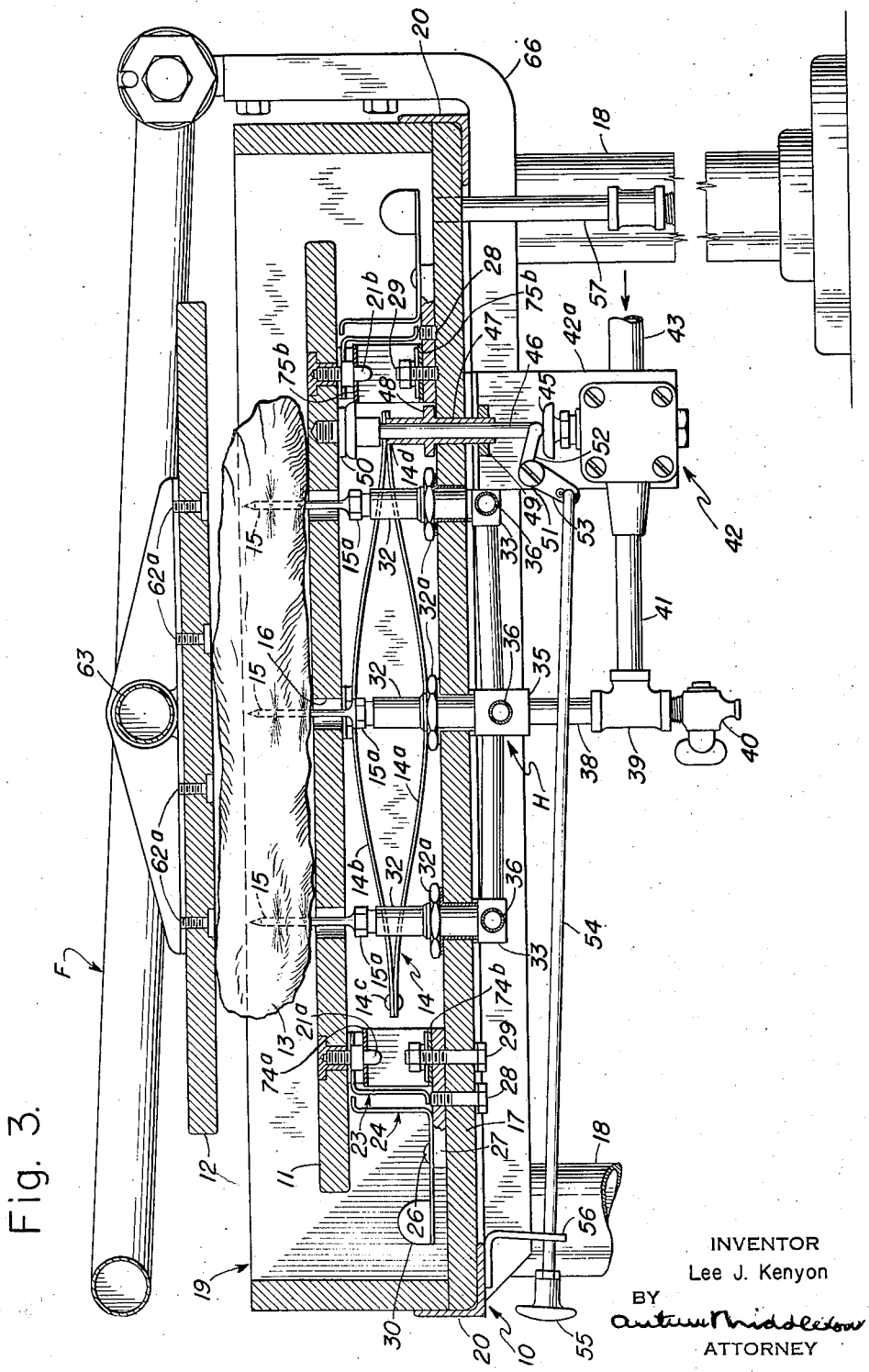
Fig. 3 is a sectional view similar to Fig. 2 although showing the meat receiving platform in depressed position.

In the curing operation proper a suitable piece of meat 13 is placed upon the platform 11 while the swingable frame F is in a raised or backwardly swung position as is fractionally indicated by the dot-and-dash line position thereof in Fig. 2. The operator then swings the frame F downwardly by grasping the front or handle portion 67 thereof until the top-confining member or plate 12 engages upon the top of the meat. Further downward pressure by the operator upon the handle portion 67 of the frame will depress the platform 11 as the meat is being compressed thereon between the members 11 and 12, thereby causing the piercing members 15 to penetrate into the meat while the brine supply is still shut-off. Thus the platform 11 may be depressed a distance $d$, that is until the piercing members have penetrated into the meat a distance equivalent to the distance $d$. Only then will the platform through its wearing member or surface 50 engage the tappet 46 which in turn will depress the valve plunger 44 to open the brine supply coincident with a corresponding continued depression of the platform by the operator's hand still pressing upon the handle portion 67. That is to say due to this lost motion relationship between the platform 11 and the actuating member of the valve as represented by the distance $d$ the injection of the brine into the meat will not start until the piercing members 15 have penetrated to a sufficient degree into the body of the meat. The operator then releases the handle portion 67 allowing the frame F to swing backwardly to its out-of-the-way dot-and-dash position, at the same time allowing the platform 11 to return to its upper limit position because of the expansion of the leaf spring units 14. Accordingly the injection of the brine into the meat is shut off at the beginning of the return movement of the platform 11 so that during the larger portion of the withdrawal of the piercing members 15 no brine will flow from them.

I claim:

1. Injection meat-curing apparatus comprising a base, a meat-receiving platform having openings therein and upwardly spaced from the base at an upper limit position and depressible to a lower limit position, guide means for the up-and-down movement of the platform comprising limit means for determining said upper limit position, compression spring means effective between said base and said platform urging the platform to its upper limit position, a set of upwardly pointed fixed piercing injection members mounted on said base and adapted to penetrate through said openings into a piece of meat placed upon said platform when pressure is exerted upon said meat sufficient to depress said platform against said spring pressure, conduit means for supplying curing fluid to said piercing members, a control valve unit for said conduit means supplied with curing fluid under pressure, lost motion actuating means effective between said platform and said valve unit whereby said platform is effective during the latter part of its depression to open fluid passage through said valve unit and to close said passage during the initial part of its return movement, said guide means comprising a plurality of guide units spaced from one another and disposed along the peripheral portion of the platform, a respective guide unit comprising a guide portion extending vertically downwardly from the underside of said platform and another guide portion extending vertically upwardly from said base and having vertical guiding relationship with the first-mentioned guide portion, each guide portion having at its free end a terminal portion, which terminal portions inter-engage in determining said upper limit position of the platform, mounting means for one of said guide portions whereby that guide portion is displaceable from its normal guiding position with respect to the other guide portion in order to release one guide portion from the other past and beyond said upper limit position.

2. Apparatus according to claim 1, in which said spring means comprise two groups of leaf spring units having a downwardly curved and an upwardly curved half portion, the respective ends of the half portions being tangentially joined to one another, one group of said spring units extending transversely of the platform and the other group of spring units extending substantially at right angles to the spring units of the first-mentioned group and longitudinally of the platform whereby a longitudinally extending spring unit is disposed and extends along each longitudinal edge portion of the platform.

3. Apparatus according to claim 1, in which said spring means comprise leaf spring units having a downwardly curved and an upwardly curved half portion, the respective ends of the half portions being tangentially joined to one another.

4. Apparatus according to claim 1, in which the base comprises a tray substantially surrounding said platform.

5. Apparatus according to claim 1, with the addition of a top-confining member movably mounted upon said base and operable to exert downward pressure upon the meat.

6. Apparatus according to claim 1, with the addition of top-confining means movably mounted upon said base and operable to exert pressure upon said meat, said confining means comprising a plate, a frame substantially surrounding said plate and swingably mounted upon said base, said plate being swingably mounted upon said frame to be tiltable about a horizontal axis which is parallel to the swinging axis of said frame.

LEE J. KENYON.

REFERENCES CITED

The following references are of record in the file of this patent:

UNITED STATES PATENTS

| Number | Name | Date |
| --- | --- | --- |
| 1,271,490 | Servatius | July 2, 1918 |
| 1,988,087 | Peron | Jan. 15, 1935 |
| 1,989,287 | Parr | Jan. 29, 1935 |